US010292197B1

(12) United States Patent
Bonn et al.

(10) Patent No.: US 10,292,197 B1
(45) Date of Patent: May 14, 2019

(54) EVOLVED PACKET DATA GATEWAY PRIORITY SERVICES

(71) Applicant: Sprint Communications Company L.P., Overland Park, KS (US)

(72) Inventors: Mark J. Bonn, Granite Bay, CA (US); Rajil Malhotra, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 141 days.

(21) Appl. No.: 15/468,201

(22) Filed: Mar. 24, 2017

(51) Int. Cl.
*H04W 24/10* (2009.01)
*H04L 29/08* (2006.01)
*H04W 28/02* (2009.01)
*H04L 12/823* (2013.01)
*H04W 72/10* (2009.01)
*H04L 12/18* (2006.01)
*H04W 76/15* (2018.01)
*H04L 29/06* (2006.01)
*H04L 5/00* (2006.01)

(52) U.S. Cl.
CPC ........... *H04W 76/15* (2018.02); *H04L 5/0051* (2013.01); *H04L 65/1033* (2013.01)

(58) Field of Classification Search
CPC ..... H04W 24/10; H04W 28/10; H04W 36/14; H04W 4/70; H04W 48/18; H04W 88/06; H04W 36/00837; H04W 36/0085; H04W 36/22; H04W 28/0289; H04W 72/10; H04L 67/10; H04L 47/22; H04L 47/32; H04L 12/18
USPC ........................................................ 370/329
See application file for complete search history.

(56) References Cited

U.S. PATENT DOCUMENTS

| 8,792,340 | B2 | 7/2014 | Chu et al. | |
| 9,088,989 | B2 | 7/2015 | Smith et al. | |
| 9,420,607 | B1* | 8/2016 | Jain | H04W 76/18 |
| 2013/0114408 | A1 | 5/2013 | Sastry et al. | |
| 2015/0109967 | A1 | 4/2015 | Hogan et al. | |
| 2015/0365963 | A1* | 12/2015 | Won | H04W 28/0268 370/329 |

(Continued)

FOREIGN PATENT DOCUMENTS

| WO | 2012130061 | 10/2012 |
| WO | 2014204276 | 12/2014 |
| WO | 2016161404 | 10/2016 |

*Primary Examiner* — Edan Orgad
*Assistant Examiner* — Vanneilian Lalchinthang (57) ABSTRACT

An ePDG is configured to receive an attachment request transmitted from a priority wireless communication device over an internet communication network and responsively transfer a create session request to a P-GW. The P-GW is configured to receive the create session request and responsively transfer a credit control request to a PCRF. The PCRF is configured to receive the credit control request and responsively determine that the priority wireless communication device has a priority modification requirement, generate modified priority data for the priority wireless communication device based on the priority modification requirement, and transfer a credit control answer with the modified priority data to the P-GW. The P-GW is configured to receive the credit control answer with the modified priority data and responsively create a default bearer between the ePDG and the P-GW for the priority wireless communication device with priority service based on the modified priority data.

14 Claims, 5 Drawing Sheets

(56) References Cited

U.S. PATENT DOCUMENTS

| | | |
|---|---|---|
| 2016/0112896 A1* | 4/2016 | Karampatsis ..... H04W 28/0252 |
| | | 370/230.1 |
| 2016/0134761 A1* | 5/2016 | Campbell ........... H04L 12/1407 |
| | | 370/259 |
| 2017/0048739 A1* | 2/2017 | Jeong ....................... H04W 4/70 |
| 2017/0134986 A1* | 5/2017 | Jeong .................... H04W 28/10 |
| 2017/0245207 A1* | 8/2017 | Stammers ............... H04W 8/24 |
| 2018/0146058 A1* | 5/2018 | Somayazulu ........... H04L 43/16 |

\* cited by examiner

EVOLVED PACKET DATA GATEWAY PRIORITY SERVICES

TECHNICAL BACKGROUND

Wireless communication systems typically include wireless access nodes which provide access to communication services for wireless communication devices over wireless links. In Long Term Evolution (LTE) communication systems, a user operates a wireless communication device, referred to as User Equipment (UE), to communicate with an eNodeB base station for data services over the LTE access network. To facilitate the provision of these data services, LTE communication systems often employ an Internet Protocol Multimedia Subsystem (IMS). The IMS is designed to enable delivery of real-time multimedia services to communication devices operated by users requesting these services. The IMS provides a control system to enable the exchange of Internet Protocol (IP) packets for Voice over IP (VoIP), Voice over Wi-Fi (VoWi-Fi), and VoLTE calls, streaming media sessions, and other data transfer services. The IMS typically utilizes the Session Initiation Protocol (SIP) to facilitate communication session setup and tear-down. Essentially, the IMS operates as a horizontal control layer that isolates an access network from the service layer that provides the content or services requested by the users.

Certain users may be afforded prioritized treatment on the LTE access network. For example, the Government Emergency Telecommunications Service (GETS) and Wireless Priority Service (WPS) are federally-administered services that provide priority access for authorized users of various agencies. Calls placed through GETS and WPS should receive priority over standard calls, enabling communication even during heavy network congestion.

Overview

A method to facilitate priority services for wireless communication devices utilizing an evolved packet data gateway (ePDG) of a data communication system is disclosed. The method comprises, in the ePDG, receiving an attachment request transmitted from a priority wireless communication device over an internet communication network and responsively transferring a create session request to a packet data network gateway (P-GW). The method further comprises, in the P-GW, receiving the create session request and responsively transferring a credit control request to a policy and charging rules function (PCRF). The method further comprises, in the PCRF, receiving the credit control request and responsively determining that the priority wireless communication device has a priority modification requirement, generating modified priority data for the priority wireless communication device based on the priority modification requirement, and transferring a credit control answer with the modified priority data to the P-GW. The method further comprises, in the P-GW, receiving the credit control answer with the modified priority data and responsively creating a default bearer between the ePDG and the P-GW for the priority wireless communication device with priority service based on the modified priority data.

A data communication system to facilitate priority services for wireless communication devices utilizing an evolved packet data gateway (ePDG) of the data communication system comprises the ePDG, a packet data network gateway (P-GW), and a policy and charging rules function (PCRF). The ePDG is configured to receive an attachment request transmitted from a priority wireless communication device over an internet communication network and responsively transfer a create session request to the P-GW. The P-GW is configured to receive the create session request and responsively transfer a credit control request to the PCRF. The PCRF is configured to receive the credit control request and responsively determine that the priority wireless communication device has a priority modification requirement, generate modified priority data for the priority wireless communication device based on the priority modification requirement, and transfer a credit control answer with the modified priority data to the P-GW. The P-GW is configured to receive the credit control answer with the modified priority data and responsively create a default bearer between the ePDG and the P-GW for the priority wireless communication device with priority service based on the modified priority data.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
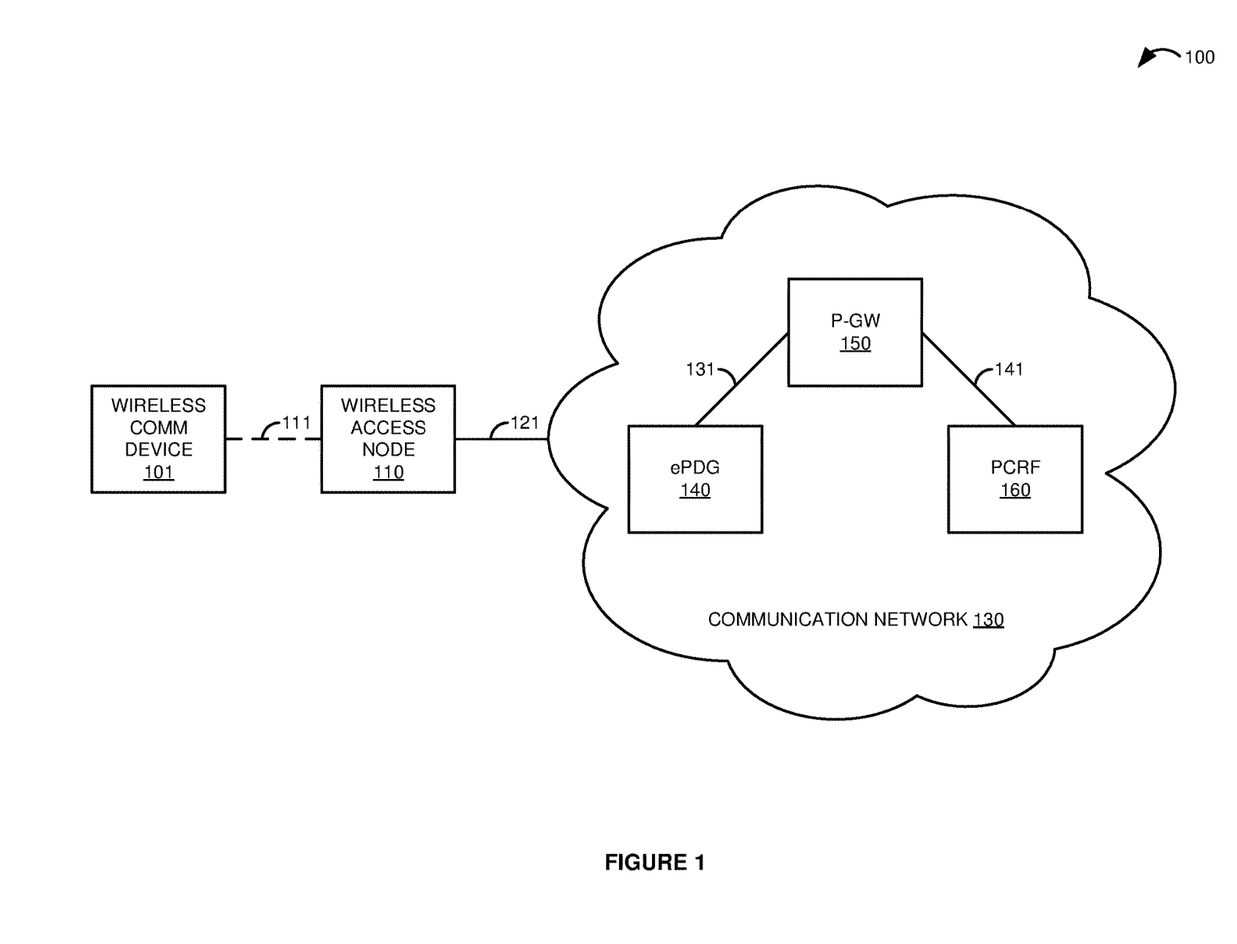
FIG. 1 is a block diagram that illustrates a data communication system.

FIG. 1 is a block diagram that illustrates data communication system 100. Data communication system 100 includes wireless communication device 101, wireless access node 110, and communication network 130. Communication network 130 includes evolved packet data gateway (ePDG) 140, packet data network gateway (P-GW) 150, and policy and charging rules function (PCRF) 160. Wireless communication device 101 and wireless access node 110 are in communication over wireless communication link 111. Wireless access node 110 and communication network 130 communicate over communication link 121. Within communication network 130, ePDG 140 and P-GW 150 communicate over communication link 131, while P-GW 150 and PCRF 160 are in communication over communication link 141. In some examples, communication network 130 may comprise elements of both a Long Term Evolution (LTE) communication network and an internet communication network.

Figure 2:
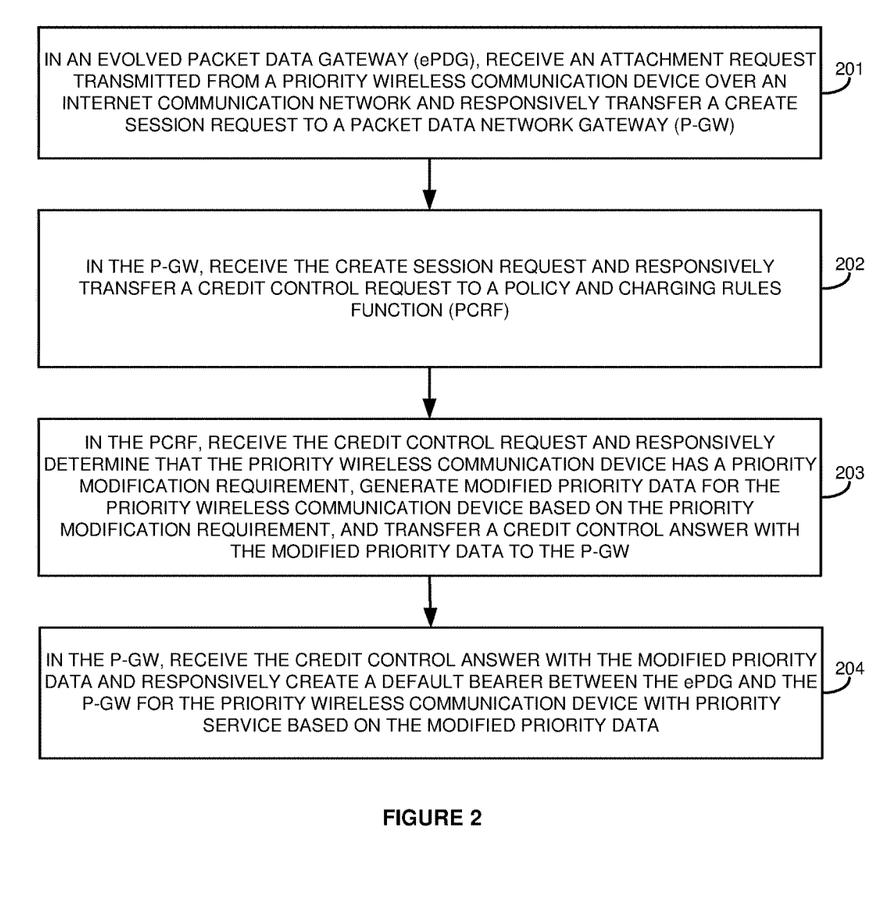
FIG. 2 is a flow diagram that illustrates an operation of the data communication system.

FIG. 2 is a flow diagram that illustrates an operation of data communication system 100. The steps of the operation are indicated below parenthetically. The operation shown in FIG. 2 may be employed by data communication system 100 to facilitate priority services for wireless communication devices utilizing ePDG 140 of data communication system 100. In order to illustrate its operations, the following discussion of the process shown in FIG. 2 will proceed with reference to ePDG 140, P-GW 150, and PCRF 160 as shown in FIG. 1, but note that the details provided in FIG. 1 are merely exemplary and not intended to limit the scope of the process to the specific implementation shown in FIG. 1.

In the operational flow of FIG. 2, ePDG 140 receives an attachment request transmitted from priority wireless communication device 101 over an internet communication network and responsively transfers a create session request to P-GW 150 (201). The attachment request could comprise any indication that wireless communication device 101 is attempting to attach to ePDG 140, register with communication network 130, or otherwise initiate communications with elements of communication network 130. In some examples, the attachment request received by ePDG 140 could comprise an Attach Request sent as non-access stratum (NAS) payload to initiate an attach procedure for wireless communication device 101. In this example, wireless communication device 101 comprises a prioritized device associated with a high-priority user. For example, priority wireless communication device 101 could be associated with a ranking government official authorized for a government emergency telecommunications service (GETS) and/or wireless priority service (WPS), a premium subscriber, or any other high-priority user. In this example, priority wireless communication device 101 attaches to ePDG 140 via an internet communication network. In some examples, wireless communication device 101 could be initiating an attach procedure in preparation to place a Voice over Wi-Fi (VoWi-Fi) call. Upon receiving the attach request, ePDG 140 responsively transfers a create session request to P-GW 150.

P-GW 150 receives the create session request and responsively transfers a credit control request to PCRF 160 (202). Effectively, the create session request from ePDG 140 to P-GW 150 triggers P-GW 150 to transfer the credit control request to PCRF 160. Typically, P-GW 150 transfers the credit control request to PCRF 160 to discover if wireless communication device 101 should receive priority services.

PCRF 160 receives the credit control request and responsively determines that priority wireless communication device 101 has a priority modification requirement, generates modified priority data for priority wireless communication device 101 based on the priority modification requirement, and transfers a credit control answer with the modified priority data to P-GW 150 (203). For example, an international mobile subscriber identity (IMSI) or some other identifier associated with wireless communication device 101 could indicate a user priority level for device 101. In at least one implementation, PCRF 160 could determine that priority wireless communication device 101 has the priority modification requirement by querying a subscriber profile repository (SPR), home subscriber server (HSS), or some other database. In some examples, the priority modification requirement could comprise a quality of service (QoS) and/or allocation and retention priority (ARP) modification requirement. Typically, upon determining that priority wireless communication device 101 has the priority modification requirement, PCRF 160 generates modified priority data based on the priority modification requirement. In some examples, PCRF 160 could generate the modified priority data by generating an ARP profile for priority wireless communication device 101. The ARP profile would typically provide a pre-emption vulnerability value, a pre-emption capability value, and a priority level for priority wireless communication device 101. For example, the pre-emption vulnerability value may indicate whether wireless communication device 101 is pre-emptable or not pre-emptable, the pre-emption capability value may indicate whether or not wireless communication device 101 is capable of pre-empting others, and the priority level could comprise a numerical value, such as a value of 1 for a highest priority, a value of 14 for a lowest priority, and a value of 15 for no priority. Accordingly, for priority wireless communication device 101, the QoS/ARP may be modified to have the pre-emption vulnerability, pre-emption capability, and priority level set to a priority service (PS) QoS/ARP based on the user priority level. After generating the modified priority data for priority wireless communication device 101 based on the priority modification requirement, PCRF 160 transfers a credit control answer with the modified priority data to P-GW 150.

P-GW 150 receives the credit control answer with the modified priority data and responsively creates a default bearer between ePDG 140 and P-GW 150 for priority wireless communication device 101 with priority service based on the modified priority data (204). Typically, P-GW 150 processes the credit control answer to discover the modified priority data and creates a default bearer with priority service for wireless communication device 101 between ePDG 140 and P-GW 150 based on the modified priority data in the credit control answer. In at least one implementation, P-GW 150 could create the default bearer for priority wireless communication device 101 with the priority service based on the modified priority data by creating the default bearer between ePDG 140 and P-GW 150 with the priority service having an ARP profile for priority wireless communication device 101. For example, P-GW 150 could create a default IMS signaling bearer between ePDG 140 and P-GW 150 with a priority service QoS/ARP for wireless communication device 101 based on the modified priority data. A dedicated bearer with priority service could also be created between ePDG 140 and P-GW 150 for priority wireless communication device 101. In some examples, ePDG 150 could receive a request to initiate a communication session transmitted by priority wireless communication device 101 and responsively create a dedicated bearer with priority service for the communication session based on the priority service of the default bearer between ePDG 140 and P-GW 150. For example, when a high-priority VoWi-Fi subscriber initiates a voice call using wireless communication device 101, a dedicated voice bearer may be created between ePDG 140 and P-GW 150 with a QoS/ARP profile having pre-emption vulnerability, pre-emption capability, and a priority level set to a PS QoS/ARP based on the user priority level.

The priority service applied to the default bearer between ePDG 140 and P-GW 150 for priority wireless communication device 101 enables ePDG 140 to examine the default or dedicated bearer priority information in a create session request or create bearer request and provide priority services and implement overload controls based on the priority of the bearer. In some examples, when ePDG 140 is overloaded with attach requests, ePDG 140 may exempt the default bearer between ePDG 140 and P-GW 150 for priority wireless communication device 101 with the priority service from pre-emption based on the priority service. In addition, when ePDG 140 is overloaded with attach requests, ePDG 140 may further prioritize a dedicated bearer request for priority wireless communication device 101 over non-priority users based on the priority service of the default bearer between ePDG 140 and P-GW 150 for priority wireless communication device 101. Further, when ePDG 140 reaches a lower utilization threshold, ePDG 140 may reject bearer creation requests for non-priority users, and allow bearer creation requests for priority wireless communication device 101 until ePDG 140 reaches an upper utilization threshold. For example, the lower and upper utilization thresholds of ePDG 140 could define central processing unit (CPU) utilization levels of ePDG 140, where the lower utilization threshold is lower than the upper utilization threshold. Further, after determining that priority wireless communication device 101 is entitled to the priority service, an identifier associated with priority wireless communication device 101 may be stored in a priority service cache with a time to live (TTL), and subsequent bearer creation requests may be automatically approved with priority service for wireless communication device 101 during the TTL based on finding the identifier associated with device 101 in the priority service cache. This cached identifier would facilitate automatic approval of subsequent attach requests, create session requests, and create bearer requests with the priority service for priority wireless communication device 101.

Advantageously, the techniques described herein enable ePDG 140 to apply priority services to bearers created for priority wireless communication device 101. By determining that priority wireless communication device 101 has a priority modification requirement, PCRF 160 generates modified priority data for priority wireless communication device 101. P-GW 150 then receives a credit control answer with the modified priority data from PCRF 160 and responsively creates a default bearer between ePDG 140 and P-GW 150 for priority wireless communication device 101 with priority service based on the modified priority data. In this manner, a new default or dedicated bearer between ePDG 140 and P-GW 150 may be dynamically defined and created for priority wireless communication device 101 with priority service and pre-emption privileges applied to the bearer.

Figure 3:
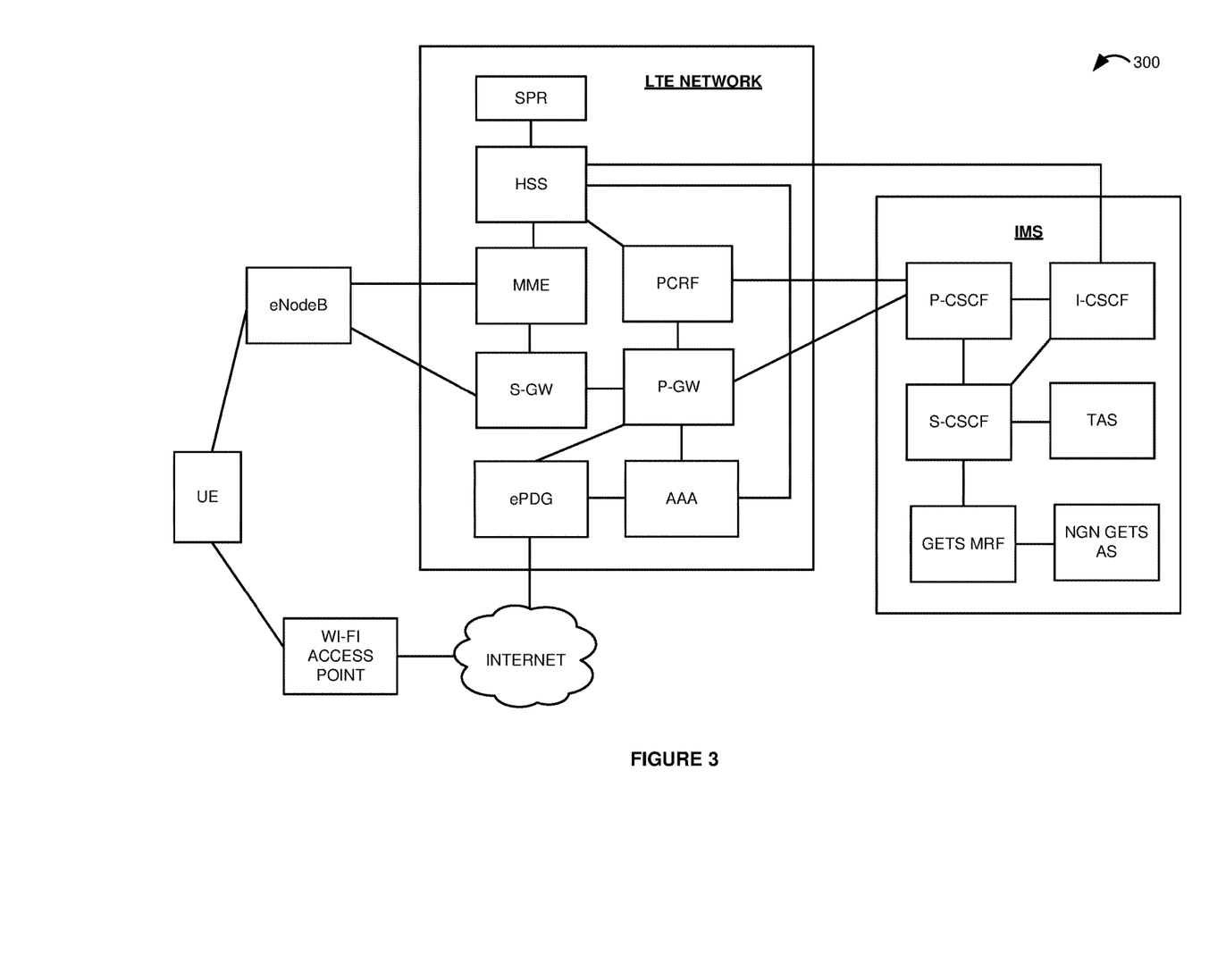
FIG. 3 is a block diagram that illustrates a data communication system in an exemplary embodiment.

FIG. 3 is a block diagram that illustrates data communication system 300 in an exemplary embodiment. Data communication system 300 is an example of data communication system 100, although data communication system 100 may use alternative configurations and operations. Data communication system 300 includes an LTE network and an IMS. Data communication system 300 includes a User Equipment (UE) device that may connect to the LTE network either via an Enhanced NodeB (eNodeB) base station or a Wi-Fi access point over the Internet. The LTE communication network in this example includes a mobility management entity (MME), home subscriber server (HSS), subscriber profile repository (SPR), serving gateway (S-GW), packet data network gateway (P-GW), policy and charging rules function (PCRF), evolved Packet Data Gateway (ePDG), and an authentication, authorization, and accounting (AAA) server. The IMS includes a proxy call session control function (P-CSCF), an interrogating call session control function (I-CSCF), a serving call session control function (S-CSCF), and a telephony application server (TAS). The IMS also includes a government emergency telecommunications service (GETS) media resource function (MRF) and a next generation network (NGN) GETS application server (AS). Although not shown, the IMS could also include other media resource functions and application servers in some examples.

In operation, a user typically operates the UE to engage in a data session via the LTE access network. In this example, the user is a high-priority government user authorized for GETS call processing with priority treatment. The user operates the UE to attach to the ePDG via the Wi-Fi access point and the Internet, and a default IMS signaling bearer is created with a priority service that enables pre-emption capabilities for the UE during resource constraints. A detailed description of one technique for bearer creation with priority service for the UE will now be discussed with respect to FIG. 4.

Figure 4:
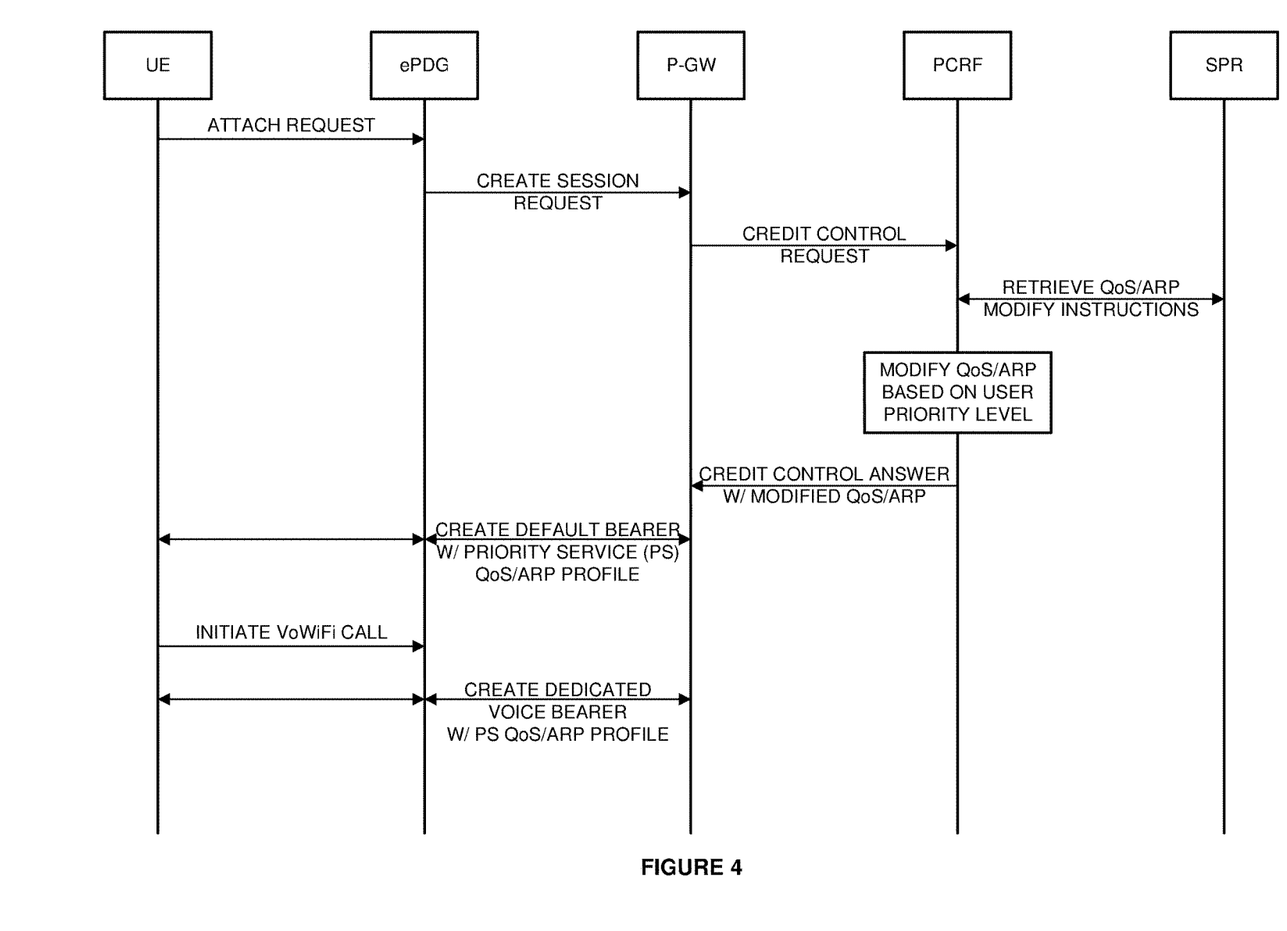
FIG. 4 is a sequence diagram that illustrates an operation of the data communication system in an exemplary embodiment.

FIG. 4 is a sequence diagram that illustrates an operation of data communication system 300 in an exemplary embodiment. The technique described below enables the ePDG to apply priority services to bearers created for the UE when the UE is attached to the ePDG over the Internet. As discussed above, in this example the user is a high-priority government user authorized for GETS call processing with priority treatment. Initially, the UE transmits an Attach Request for delivery to the ePDG, and the ePDG responsively transfers a Create Session Request to the P-GW. Receipt of the Create Session Request by the P-GW triggers a Credit Control Request to the PCRF.

Responsive to the Credit Control Request, the PCRF queries the SPR to determine if the user has a QoS/ARP modification requirement. The PCRF thus retrieves the QoS/ARP modification instructions from the SPR. For the high-priority subscriber in this example, the QoS/ARP will be modified to have the pre-emption vulnerability, pre-emption capability, and priority level set to a priority service (PS) QoS/ARP based on the user priority level retrieved from the SPR. The PCRF then provides a Credit Control Answer with the modified QoS/ARP to the P-GW.

The P-GW receives the Credit Control Answer with the modified QoS/ARP and responsively creates a default IMS signaling bearer for the UE with the PS QoS/ARP specified in the Credit Control Answer. Subsequently, when the high-priority VoWi-Fi subscriber initiates a VoWi-Fi call, an on-demand dedicated voice bearer is created between the ePDG and the P-GW in the same way a dedicated voice bearer would be created if the user originated on the LTE radio access type, with the dedicated voice bearer between the ePDG and the P-GW having a QoS/ARP profile with pre-emption vulnerability, pre-emption capability, and priority level set to a PS QoS/ARP based on the user priority level.

Beneficially, by implementing the techniques disclosed herein, the ePDG is able to examine the default or dedicated bearer QoS/ARP in the create session request or create bearer request to provide preferential treatment during overload controls and other priority services based on the priority of the bearer. For example, if the ePDG is overloaded with attach requests on the ingress interface, the ePDG will exempt pre-empting any established default or dedicated bearers with a QoS/ARP profile. Further, if the high-priority VoWi-Fi user already has a default bearer with a QoS/ARP profile established with the ePDG, this context will provide prioritized treatment for any dedicated bearer request for the priority user over other public, non-priority users. The ePDG may also support CPU busy thresholds for PS users and non-priority users. For example, if the ePDG CPU utilization hits the public "lower" CPU busy threshold, non-priority public users would be vulnerable to pre-emption such that all requests for default IMS signaling bearers for these non-priority users would be rejected and the Internet Protocol Security (IPsec) tunnel torn down, and any dedicated voice bearers requested with a public QoS/ARP profile would also be rejected. However, even when the ePDG CPU utilization is above the public "lower" CPU busy threshold, all default and dedicated bearer requests with a QoS/ARP profile having priority above the public user QoS/ARP priority would be allowed, until an "upper" CPU busy threshold is reached. Additionally, if the user attaching was determined to be a PS subscribed based on the bearer QoS/ARP, a cache of the user's IMSI could be stored with an optional time-to-live (TTL). This would allow an IMSI for subsequent connection requests from a VoWi-Fi PS user to be used as a lookup key in the PS cache, and if found, would provide for automatic admission for priority bearer setup with immunity to any overload controls in the ePDG. Accordingly, priority services may be implemented in the ePDG for priority bearer admission and retention relative to other public non-priority UEs attaching to the ePDG.

Figure 5:
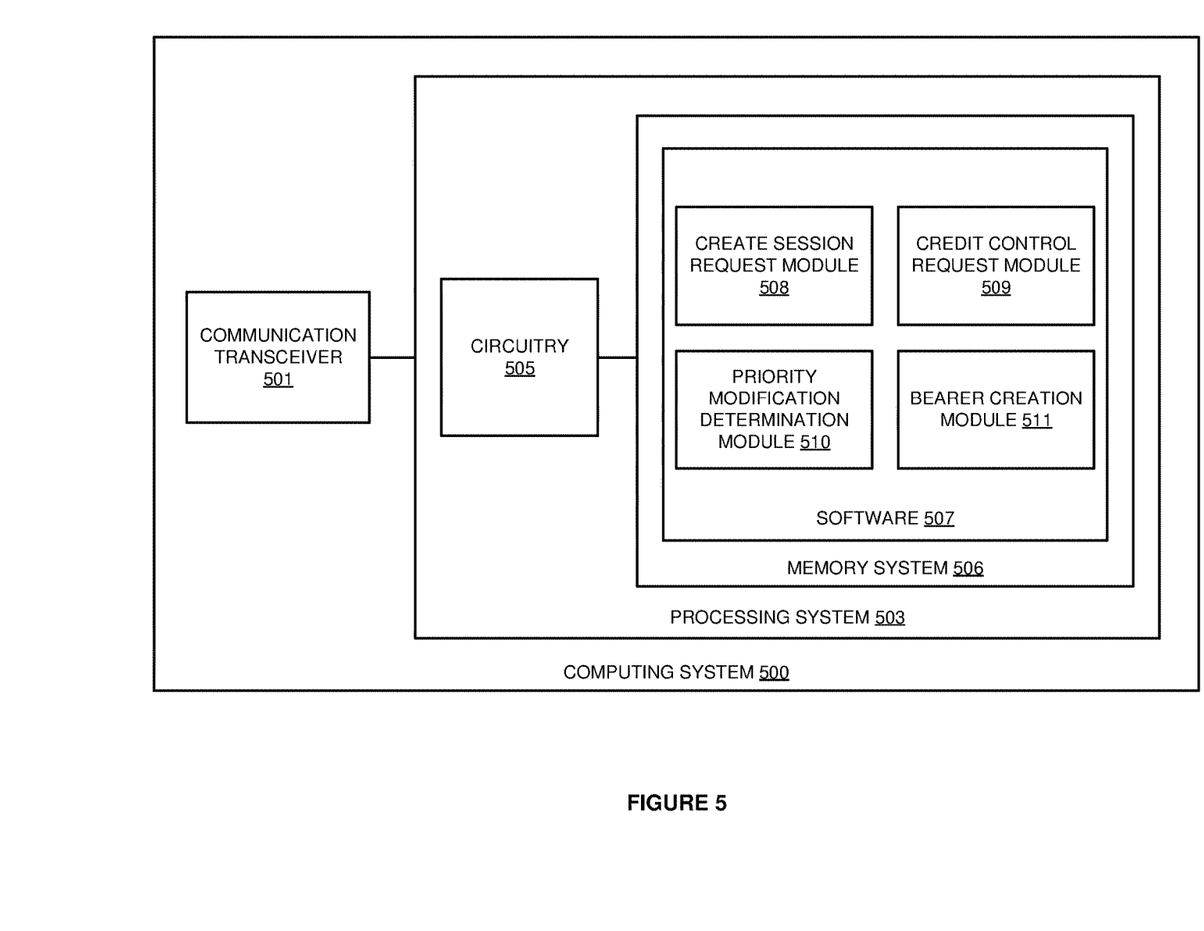
FIG. 5 is a block diagram that illustrates a computing system.

FIG. 5 is a block diagram that illustrates computing system 500. Computing system 500 provides an example of ePDG 140, P-GW 150, and PCRF 160, although systems 140, 150, and 160 may have alternative configurations. Computing system 500 may be representative of any computing apparatus, system, or systems on which the techniques disclosed herein or variations thereof may be suitably implemented. Computing system 500 comprises communication transceiver 501 and processing system 503. Processing system 503 is linked to communication transceiver 501. Processing system 503 includes processing circuitry 505 and memory system 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use time-division multiplexing (TDM), Internet Protocol (IP), SIP, Ethernet, optical networking, wireless protocols, communication signaling, or some other communication format, including combinations thereof. Communication transceiver 501 could be configured to receive an attachment request transmitted from a priority wireless communication device over an internet communication network and responsively transfer a create session request to a packet data network gateway (P-GW). Communication transceiver 501 could be further configured to receive the create session request and responsively transfer a credit control request to a policy and charging rules function (PCRF). Communication transceiver 501 could be further configured to receive the credit control request and transfer a credit control answer with modified priority data to the P-GW. Communication transceiver 501 could be further configured to receive the credit control answer with the modified priority data.

Processing circuitry 505 comprises microprocessor and other circuitry that retrieves and executes operating software 507 from memory system 506. Processing circuitry 505 may comprise a single device or could be distributed across multiple devices, including devices in different geographic areas. Processing circuitry 505 may be embedded in various types of equipment. Examples of processing circuitry 505 include central processing units, application specific processors, logic devices, and/or any type of computer processing devices, including combinations thereof. Memory system 506 comprises a non-transitory computer readable storage medium readable by processing circuitry 505 and capable of storing software 507, such as a disk drive, flash drive, data storage circuitry, or some other hardware memory apparatus. Memory system 506 may comprise a single device or could be distributed across multiple devices, including devices in different geographic areas. Memory system 506 may be embedded in various types of equipment. In some examples, a computer apparatus could comprise memory system 506 and operating software 507. Operating software 507 may be implemented in program instructions and may be executed by processing system 503. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for ePDG 140, P-GW 150, and PCRF 160. In particular, operating software 507 may direct processing system 503 to direct communication transceiver 501 to receive an attachment request transmitted from a priority wireless communication device over an internet communication network and responsively transfer a create session request to a packet data network gateway (P-GW). Operating software 507 may also direct processing system 503 to direct communication transceiver 501 to receive the create session request and responsively transfer a credit control request to a policy and charging rules function (PCRF). Operating software 507 may also direct processing system 503 to receive the credit control request and responsively determine that the priority wireless communication device has a priority modification requirement, generate modified priority data for the priority wireless communication device based on the priority modification requirement, and direct communication transceiver 501 to transfer a credit control answer with the modified priority data to the P-GW. Operating software 507 further directs processing system 503 to receive the credit control answer with the modified priority data and responsively create a default bearer between the ePDG and the P-GW for the priority wireless communication device with priority service based on the modified priority data.

In this example, operating software 507 comprises a create session request software module 508 that receives an attachment request transmitted from a priority wireless communication device over an internet communication network and responsively transfers a create session request to a packet data network gateway (P-GW). Operating software 507 also comprises a credit control request software module 509 that receives the create session request and responsively transfers a credit control request to a policy and charging rules function (PCRF). Operating software 507 further comprises a priority modification determination software module 510 that receives the credit control request and responsively determines that the priority wireless communication device has a priority modification requirement, generates modified priority data for the priority wireless communication device based on the priority modification requirement, and transfers a credit control answer with the modified priority data to the P-GW. Operating software 507 also comprises a bearer creation software module 511 that receives the credit control answer with the modified priority data and responsively creates a default bearer between the ePDG and the P-GW for the priority wireless communication device with priority service based on the modified priority data.

Now referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a User Equipment (UE) device, telephone, transceiver, mobile phone, cellular phone, smartphone, computer, personal digital assistant (PDA), e-book, game console, mobile Internet device, wireless network interface card, media player, or some other wireless communication apparatus, including combinations thereof. Wireless communication device 101 could comprise a dual-mode device capable of communicating over multiple wireless protocols, including LTE wireless networks and non-LTE wireless networks. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long-Term Evolution (3GPP LTE), LTE Advanced, Worldwide Interoperability for Microwave Access (WiMAX), IEEE 802.11 wireless local area network (WLAN) protocols (Wi-Fi), Bluetooth, Internet, telephony, or any other wireless network protocol that facilitates communication between wireless communication device 101 and a communication network.

Wireless access node 110 comprises RF communication circuitry and an antenna. The RF communication circuitry typically includes amplifiers, filters, RF modulators, transceivers, and signal processing circuitry. Wireless access node 110 may also comprise a router, server, memory device, software, processing circuitry, cabling, power supply, network communication interface, structural support, or some other communication apparatus. Wireless access node 110 may further comprise a processing system, such as a microprocessor, computer-readable storage device, and executable processing instructions, which may be used to provide access to communication services to various devices. Wireless access node 110 could comprise a macro base station, pico base station, wireless access point, Internet access node, telephony service node, wireless data access point, or some other wireless communication system, including combinations thereof. Some examples of wireless access node 110 include a base transceiver station (BTS), base station controller (BSC), radio base station (RBS), Node B, enhanced Node B (eNodeB), pico eNodeB, relay node, relay backhaul node, picocell, femtocell, Wi-Fi hotspot, and others, including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format, including combinations thereof.

Communication network 130 comprises the core network of a wireless communication service provider, and could include routers, gateways, telecommunication switches, servers, processing systems, or other communication equipment and systems for providing communication and data services. In some examples, communication network 130 comprises a cellular voice and data network that can provide voice calls, text messages, data access, or other communication services provided over cellular or wireless communication networks. In some examples, communication network 130 includes equipment to provide wireless access to communication services within different coverage areas to user devices, route communications between content providers and user devices, and facilitate handoffs between equipment of different coverage areas, among other operations. Communication network 130 could comprise wireless communication nodes, telephony switches, Internet routers, network gateways, computer systems, communication links, or some other type of communication equipment, including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems, including combinations thereof. Communication network 130 can also comprise elements such as mobility management entity (MME) equipment, home subscriber servers (HSS), policy and charging rules function (PCRF) nodes, packet data network gateways (P-GW), serving gateways (S-GW), base stations, base transceiver stations (BTS), base station controllers (BSC), eNodeB equipment, mobile switching centers (MSC), home location registers (HLR), radio node controllers (RNC), authentication, authorization and accounting (AAA) equipment, access service network gateways (ASN-GW), packet data switching nodes (PDSN), Internet access nodes, database systems, or other communication and control equipment. In some implementations, communication network 130 may also include an IMS, which may reside in a single device or may be distributed across multiple devices. In some examples, the IMS in communication network 130 could comprise a session boarder controller (SBC), proxy call session control function (P-CSCF), interrogating call session control function (I-CSCF), serving call session control function (S-CSCF), telephony application server (TAS), media resource function (MRF), application server, session initiation protocol (SIP) server, or some other communication system, including combinations thereof. Communication network 130 may be configured to communicate over metallic, wireless, or optical links, including combinations thereof. Communication network 130 may be configured to use time-division multiplexing (TDM), Internet Protocol (IP), Ethernet, optical networking, wireless protocols, communication signaling, or some other communication format, including combinations thereof. In some examples, communication network 130 includes further access nodes and associated equipment for providing communication services to many wireless communication devices across a large geographic region.

Wireless communication link 111 use the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format, including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions, including combinations thereof.

Communication links 121, 131, and 141 use metal, air, space, optical fiber such as glass or plastic, or some other material as the transport medium, including combinations thereof. Communication links 121, 131, and 141 could use various communication protocols, such as TDM, IP, Ethernet, telephony, optical networking, hybrid fiber coax (HFC), communication signaling, wireless protocols such as such as CDMA, GSM, UMTS, HSPA, EV-DO, EV-DO rev. A, B, and C, 3GPP LTE, LTE Advanced, WiMAX, Wi-Fi, Bluetooth, or some other communication format, including combinations thereof. Communication links 121, 131, and 141 may be direct links or could include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate priority services for wireless communication devices utilizing an evolved packet data gateway (ePDG) of a data communication system, the method comprising:
   in the ePDG, receiving an attachment request transmitted from a priority wireless communication device over an internet communication network and responsively transferring a create session request to a packet data network gateway (P-GW);
   in the P-GW, receiving the create session request and responsively transferring a credit control request to a policy and charging rules function (PCRF);
   in the PCRF, receiving the credit control request and responsively determining that the priority wireless communication device has a priority modification requirement, generating an Allocation and Retention Priority (ARP) profile for the priority wireless communication device based on the priority modification requirement wherein the ARP profile for the priority wireless communication device provides at least one of a pre-emption vulnerability value, a pre-emption capability value, and a priority level for the priority wireless communication device, and transferring a credit control answer with the ARP profile to the P-GW; and
   in the P-GW, receiving the credit control answer with the ARP profile and responsively creating a default bearer between the ePDG and the P-GW for the priority wireless communication device with priority service having the ARP profile.

2. The method of claim 1 further comprising receiving a request to initiate a communication session transmitted by the priority wireless communication device and responsively creating a dedicated bearer with priority service for the communication session based on the priority service of the default bearer between the ePDG and the P-GW.

3. The method of claim 1 wherein determining that the priority wireless communication device has the priority modification requirement comprises querying a subscriber profile repository (SPR) to determine that the priority wireless communication device has the priority modification requirement.

4. The method of claim 1 further comprising, when the ePDG is overloaded with attach requests, exempting the default bearer between the ePDG and the P-GW for the priority wireless communication device with the priority service from pre-emption based on the priority service.

5. The method of claim 1 further comprising, when the ePDG is overloaded with attach requests, prioritizing a dedicated bearer request for the priority wireless communication device over non-priority users based on the priority service of the default bearer between the ePDG and the P-GW for the priority wireless communication device.

6. The method of claim 1 further comprising, when the ePDG reaches a lower utilization threshold, rejecting bearer creation requests for non-priority users, and allowing bearer creation requests for the priority wireless communication device until the ePDG reaches an upper utilization threshold.

7. The method of claim 1 further comprising storing an identifier associated with the priority wireless communication device in a priority service cache with a time to live (TTL), and automatically approving subsequent bearer creation requests with priority service for the priority wireless communication device during the TTL based on finding the identifier associated with the priority wireless communication device in the priority service cache.

8. A data communication system to facilitate priority services for wireless communication devices utilizing an evolved packet data gateway (ePDG) of the data communication system, wherein the data communication system comprises one or more processors and program instructions to be executed by the one of more processors, and comprising:
   the ePDG configured to receive an attachment request transmitted from a priority wireless communication device over an internet communication network and responsively transfer a create session request to a packet data network gateway (P-GW);
   the P-GW configured to receive the create session request and responsively transfer a credit control request to a policy and charging rules function (PCRF);
   the PCRF configured to receive the credit control request and responsively determine that the priority wireless communication device has a priority modification requirement, generate an Allocation and Retention Priority (ARP) profile for the priority wireless communication device based on the priority modification requirement wherein the ARP profile for the priority wireless communication device provides a pre-emption vulnerability value, a pre-emption capability value, and a priority level for the priority wireless communication device, and transfer a credit control answer with the ARP profile to the P-GW; and
   the P-GW configured to receive the credit control answer with the ARP profile and responsively create a default bearer between the ePDG and the P-GW for the priority wireless communication device with priority service having the ARP profile.

9. The data communication system of claim 8 wherein the ePDG is further configured to receive a request to initiate a communication session transmitted by the priority wireless communication device and responsively create a dedicated bearer with priority service for the communication session based on the priority service of the default bearer between the ePDG and the P-GW.

10. The data communication system of claim 8 wherein the PCRF configured to determine that the priority wireless communication device has the priority modification requirement comprises the PCRF configured to query a subscriber profile repository (SPR) to determine that the priority wireless communication device has the priority modification requirement.

11. The data communication system of claim 8 wherein the ePDG is further configured to, when the ePDG is overloaded with attach requests, exempt the default bearer between the ePDG and the P-GW for the priority wireless communication device with the priority service from preemption based on the priority service.

12. The data communication system of claim 8 wherein the ePDG is further configured to, when the ePDG is overloaded with attach requests, prioritize a dedicated bearer request for the priority wireless communication device over non-priority users based on the priority service of the default bearer between the ePDG and the P-GW for the priority wireless communication device.

13. The data communication system of claim 8 wherein the ePDG is further configured to, when the ePDG reaches a lower utilization threshold, reject bearer creation requests for non-priority users, and allow bearer creation requests for the priority wireless communication device until the ePDG reaches an upper utilization threshold.

14. The data communication system of claim 8 wherein the ePDG is further configured to store an identifier associated with the priority wireless communication device in a priority service cache with a time to live (TTL), and automatically approve subsequent bearer creation requests with priority service for the priority wireless communication device during the TTL based on finding the identifier associated with the priority wireless communication device in the priority service cache.

* * * * *